(12) United States Patent
Yamaguchi et al.

(10) Patent No.: US 9,296,175 B2
(45) Date of Patent: Mar. 29, 2016

(54) INJECTION MOLDED BODY AND METHOD FOR PRODUCING SAME

(75) Inventors: Koji Yamaguchi, Nagoya (JP); Masaru Tateyama, Nagoya (JP); Nobuhiko Shimizu, Nagoya (JP); Hironori Imai, Nagoya (JP)

(73) Assignee: Toray Industries, Inc. (JP)

( * ) Notice: Subject to any disclaimer, the term of this patent is extended or adjusted under 35 U.S.C. 154(b) by 294 days.

(21) Appl. No.: 14/001,887

(22) PCT Filed: Feb. 24, 2012

(86) PCT No.: PCT/JP2012/054629
§ 371 (c)(1),
(2), (4) Date: Aug. 28, 2013

(87) PCT Pub. No.: WO2012/117975
PCT Pub. Date: Sep. 7, 2012

(65) Prior Publication Data
US 2013/0337253 A1 Dec. 19, 2013

(30) Foreign Application Priority Data

Feb. 28, 2011 (JP) .................................. 2011-041545
Mar. 31, 2011 (JP) .................................. 2011-078006

(51) Int. Cl.
| B29C 45/00 | (2006.01) |
| B32B 5/14 | (2006.01) |
| B29C 45/56 | (2006.01) |
| B29K 105/14 | (2006.01) |

(52) U.S. Cl.
CPC ............. *B32B 5/145* (2013.01); *B29C 45/0005* (2013.01); *B29C 45/561* (2013.01); *B29K 2105/14* (2013.01); *Y10T 428/249942* (2015.04)

(58) Field of Classification Search
USPC .......................... 428/220, 298.1; 264/328.18
See application file for complete search history.

(56) References Cited

U.S. PATENT DOCUMENTS

| 5,275,776 A | 1/1994 | Hara et al. |
| 2006/0145395 A1* | 7/2006 | Takigawa .................... 264/297.2 |
| 2012/0015186 A1* | 1/2012 | Honma et al. ................ 428/375 |

FOREIGN PATENT DOCUMENTS

| JP | 03-076614 A | 4/1991 |
| JP | 06-322144 | 11/1994 |
| JP | 06-322144 A | 11/1994 |
| JP | 06-328535 | 11/1994 |
| JP | 06-328535 A | 11/1994 |
| JP | 2000-061969 A | 2/2000 |
| JP | 2002-096356 A | 4/2002 |
| JP | 2002-127215 A | 5/2002 |
| JP | 2002-166452 A | 6/2002 |
| JP | 2003-171564 A | 6/2003 |
| JP | 2006-272849 A | 10/2006 |
| JP | 2006-327051 | 12/2006 |
| JP | 2006-327051 A | 12/2006 |

* cited by examiner

*Primary Examiner* — Tahseen N Khan
(74) *Attorney, Agent, or Firm* — DLA Piper LLP (US)

(57) ABSTRACT

An injection molded body includes a fiber reinforced thermoplastic resin composition formed by combining fibrous filler with thermoplastic resin so that the weight average fiber length in the injection molded body is 300 μm or more, and the injection molded body has a skin layer, a core layer and a skin layer in this order in the thickness direction. The thickness of the core layer, in which the primary orientation direction of the fibrous filler is 40° or less when the direction perpendicular to the flow direction of the resin composition at the time of injection molding is set at 0°, is 20% or less relatively to the thickness of the injection molded body.

8 Claims, 13 Drawing Sheets

INJECTION MOLDED BODY AND METHOD FOR PRODUCING SAME

TECHNICAL FIELD

This disclosure relates to an injection molded body comprising a fiber reinforced thermoplastic resin composition formed by combining a thermoplastic resin and fibrous filler and a method of producing the same, and relates to an injection molded body wherein the weight average fiber length of the fibrous filler in the injection molded body is 300 μm or more, and which is little in variation of strength and low in warping, and a method for producing the same.

In more detail, this disclosure relates to an injection molded body formed with three layers of a skin layer, a core layer and a skin layer in the thickness direction by injection molding, which comprises a skin layer randomly oriented with fibrous filler and a core layer oriented with fibrous filler in a direction perpendicular to a flow direction at the time of injection molding and which is strengthened as the whole of the injection molded body and lowered in warping by making the thickness of the core layer small, and a method of producing the same.

BACKGROUND

A thermoplastic resin is molded, from its excellent moldability and processability by various processing methods, for example, injection molding, blow molding, sheet molding, film molding, extrusion molding, press molding, etc., and is used to produce products for uses in a wide range such as electric/electronic equipment, OA (office automation) equipment, equipment for vehicles, miscellaneous goods, etc. In particular, injection molding becomes a main processing method for a thermoplastic resin in terms of a high productivity and a high shape freedom.

Further, in the case where particularly high strength, stiffness and thermal resistance is required for a thermoplastic resin, a method of modifying the raw material by adding fibrous filler is generally employed. As a typical example of such a raw material, exemplified are fiber reinforced thermoplastic resin pellets obtained by melt kneading a thermoplastic resin and glass fibers or carbon fibers together by an extruder when the thermoplastic resin is pelletized. However, if injection molding is carried out using the fiber reinforced thermoplastic resin pellets thus obtained, because the fibrous filler is oriented in a core layer in a direction perpendicular to a resin flow direction at the time of injection molding and oriented in a skin layer in the resin flow direction, anisotropy is generated in strength and shrinkage. As a result, with respect to a molded body obtained, warping increases.

As a means of solving such a defect, long fiber pellets for the purpose of strengthening and reducing the warping by lengthening fibers remaining in the molded body has been developed. However, even if the long fiber pellets are used, when a usual injection molding is carried out, because the orientation directions of fibrous filler are different between in the skin layer and in the core layer, there is still a situation where a satisfactory advantage cannot be obtained.

As a molding method to prevent warping, JP-A-2000-061969 and JP-A-2006-272849 describe an injection press molding method, but there is no description therein as to a method of controlling orientation of fibers in a molded product. Further, with respect to a method of reducing warping in a molded body, JP-A-2003-171564 describes an effect of reducing warping by giving a characteristic to a resin to be combined, but it does not control warping from anisotropy of fiber orientation. Further, as a means of disturbing orientation of fibers in a molded body, JP-A-2002-166452 describes a structure of a mold having a movable insert die. In that mold, orientation of fibers is disturbed by rotating the cavity surface to give a shear to a material to be molded into a molded body, but the ability to disturb the orientation is small, and there is a limitation in shape of the molded body. Furthermore, JP-A-2002-096356 describes a molding device with a mold for injection press molding which has a structure of a waste cavity (dummy cavity), but it does not describe as to molding of a fiber reinforced resin at all.

It could therefore be helpful to provide an injection molded body which is excellent in strength and stiffness, small in anisotropy of strength in the molded body and extremely low in warping, and a method of producing the same.

SUMMARY

We provide an injection molded body comprising a fiber reinforced thermoplastic resin composition formed by combining fibrous filler (b) with a thermoplastic resin (a) so that a weight average fiber length in the injection molded body is 300 μm or more, and has a skin layer, a core layer and a skin layer in this order in a thickness direction, wherein a thickness of the core layer, in which a primary orientation direction of the fibrous filler (b) is 40° or less when a direction perpendicular to a flow direction of the fiber reinforced thermoplastic resin composition at the time of injection molding is set at 0°, is 20% or less relatively to a thickness of the injection molded body (a thickness of the whole of the injection molded body having the skin layer, the core layer and the skin layer in this order).

In such an injection molded body, since the thickness of the core layer in the injection molded body having the skin layer, the core layer and the skin layer in this order is suppressed small to be 20% or less relatively to the thickness of the whole of the injection molded body as compared with a conventional molded body, influence due to the anisotropy in strength and shrinkage, originating from a condition where the orientation directions of fibrous filler in the core layer and the skin layer are different from each other, can be suppressed, and it becomes possible to suppress the warping of the molded body generated by the anisotropy extremely low.

In the above-described injection molded body, it is preferred that the fibrous filler (b) is combined so that the weight average fiber length in the injection molded body is 600 μm or more.

Further, as the above-described thermoplastic resin (a), for example, at least one selected from the group consisting of a polypropylene, a polyimide, a polyphenylene sulfide, a polyimide, a polyetherketone and a polyetheretherketone can be used.

Further, as the above-described fibrous filler (b), for example, at least one selected from the group consisting of carbon fibers, glass fibers and aramide fibers can be used.

Further, although the thickness of the whole of the injection molded body is not particularly limited, if the thickness of the injection molded body is in a range of 0.5 mm to 10 mm, the effect of reducing the warping is exhibited remarkably.

Further, it is preferred that the orientation direction of the fibrous filler (b) in the above-described skin layer is random as much as possible.

Such an injection molded body can be produced by the following first or second method. First, the first method is a method of producing an injection molded body by injection molding a fiber reinforced thermoplastic resin composition formed by combining fibrous filler (b) with a thermoplastic resin (a) so that a weight average fiber length in the injection molded body is 300 μm or more, by injection press molding, characterized in that pressing is carried out after 80 vol. % or more of a main cavity volume of a mold is filled with the fiber reinforced thermoplastic resin composition. The "main cavity" means a cavity formed in a shape equal to a shape of a product to be molded.

In this first method, a manner can be employed wherein in a pressing step, the fiber reinforced thermoplastic resin composition of 10 vol. % or more of the main cavity volume of the mold is pushed out from a flow end part of the fiber reinforced thermoplastic resin composition outside the main cavity of the mold (for example, into a waste cavity which is different from the main cavity formed in a shape equal to a shape of a product to be molded).

Further, as the above-described fiber reinforced thermoplastic resin composition, long fiber pellets with a same length as a length of the fibrous filler (b) can be used, and using them, the injection press molding can be carried out.

The second method is a method of producing an injection molded body by injection molding a fiber reinforced thermoplastic resin composition formed by combining fibrous filler (b) with a thermoplastic resin (a) so that a weight average fiber length in the injection molded body is 300 μm or more, by injection press molding in which a mold is started to be closed after injection is started, wherein injection molding is carried out at a condition where a ratio (t2/t1) of a difference (t2) between a time of finishing injection (tif) and a time of finishing to close the mold (tpf) to a difference (t1) between a time of starting to close the mold (tps) and the time of finishing injection (tif) becomes 1.1 or more.

Also, in this second method, as the above-described fiber reinforced thermoplastic resin composition, long fiber pellets with a same length as a length of the fibrous filler (b) can be used, and using them, the injection press molding can be carried out.

In the injection molded body and the method of producing the same, since the thickness of the core layer relative to the thickness of the injection molded body can be made small, and in the obtained injection molded body, the core layer in which the fibrous filler is strongly oriented in the direction perpendicular to the resin flow direction becomes small, the influence due to anisotropy between the core layer and the skin layer can be suppressed small, and warping originating from the anisotropy can be suppressed extremely low. Therefore, the injection molded body can be suitably used, in particular, for a molded body required with a low warping property, for example, for a housing, a chassis or a gear of electric/electronic equipment, a hood, a door panel, a roof, a back door, a door inner, a radiator core support of vehicle parts and the like. In particular, it can be suitably used for large-sized parts with large areas.

EXPLANATION OF SYMBOLS

Figure 1:
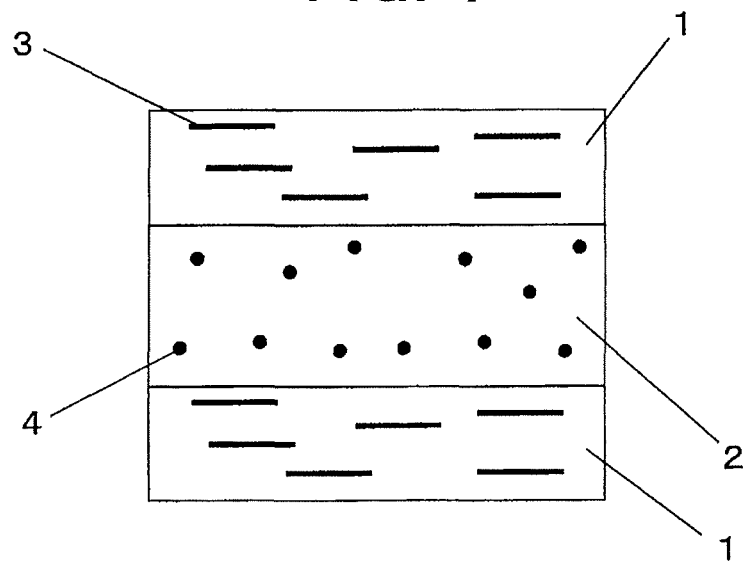
FIG. 1 is a modification diagram showing an orientation state of fibers of an injection molded body comprising a short fiber reinforced resin composition.

1: skin layer
2: core layer
3: short fiber oriented in resin flow direction
4: short fiber oriented in direction perpendicular to resin flow
5: long fiber random in orientation in skin layer
6, 21: movable side mold
7, 22: fixed side mold
8: main cavity 9: waste cavity
10: spring-type movable gate
11, 24: hot runner system
12, 25: sticking-out pin as ejector
13, 26: ejector plate
14, 27: fiber reinforced thermoplastic resin filled into cavity
15, 28: injection molded body
23: cavity
31: test piece
32: movable side mold
33: fixed side mold
34: main cavity
35: waste cavity
36: molded body

DETAILED DESCRIPTION

Hereinafter, our injection molded bodies and methods will be explained in detail.

A fiber reinforced thermoplastic resin composition combining a thermoplastic resin (a) and fibrous filler (b) is injection molded, and in a molded body formed by injection molding, the weight average fiber length in the injection molded body is 300 µm or more. In such an injection molded body comprising the fiber reinforced thermoplastic resin composition, when the molded body is produced, a core layer in which the fibrous filler is oriented in a direction perpendicular to a flow direction of the thermoplastic resin composition (hereinafter, also referred to as "TD direction") and a skin layer in which the fibrous filler is oriented mainly in the flow direction of the thermoplastic resin composition (hereinafter, also referred to as "MD direction") are formed.

The weight average fiber length in the injection molded body is a value determined by burning the injection molded body to ashes at 500° C. for 2 hours, taking out the fibrous filler in the molded body, putting the fibrous filler taken out into water, dispersing it uniformly using a ultrasonic washer, sampling 1 cc thereof into a Petri dish having a depression of 10×10 mm and thereafter drying it, taking a photograph of the fibrous filler in the Petri dish, and measuring the lengths of about 1000 fibers and calculating the value by the following equation:

$$\text{Weight average fiber length} = \Sigma(Mi^2 \times Ni)/\Sigma(Mi \times Ni)$$

Mi: fiber length (mm)
Ni: number of fibers.

In the case where a resin composition called generally as short fiber pellets, in which fibrous filler in an injection molded body is less than 300 µm, is used, for example, as shown in FIG. 1, it exhibits a structure where short fibers 3 are strongly oriented in an MD direction (a resin flow direction) in skin layers 1 and short fibers 4 are strongly oriented in a TD direction (a direction perpendicular to the resin flow) in a core layer 2. Therefore, even if the thickness of the core layer is made small, the anisotropy does not become low, the effect of reducing warping is limited, and the advantage cannot be exhibited.

Figure 2:
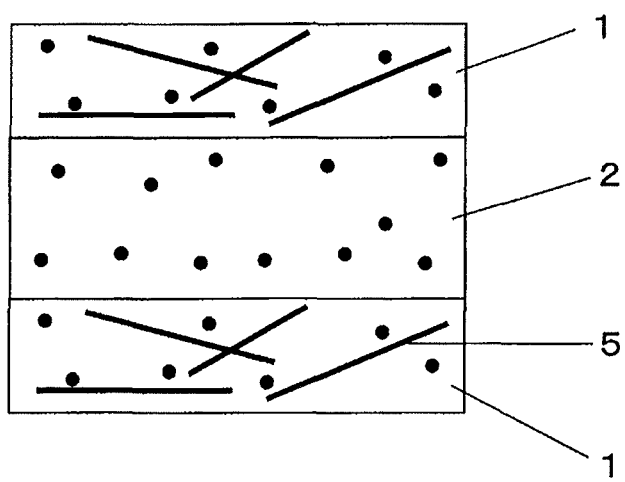
FIG. 2 is a modification diagram showing an orientation state of fibers of an injection molded body comprising a long fiber reinforced resin composition.

If the fibrous filler in an injection molded body becomes longer (that is, becomes long fibers), for example, as shown in FIG. 2, although the orientation of fibers in the core layer 2 is kept in the direction perpendicular to the resin flow, the orientation of long fibers 5 in the skin layers 1 tends to be random. In particular, if the weight average fiber length of the fibrous filler in the injection molded body becomes 300 µm or more, the orientation in the skin layer begins to be random. Moreover, by making the core layer with a strong orientation thin, warping of the injection molded body can be greatly reduced. Furthermore, in the case where the weight average fiber length of the fibrous filler in the injection molded body is 600 µm or more, the orientation in the skin layer is further random, and because the anisotropy becomes lower and the warping is further reduced greatly, such a condition is more preferable.

As a method of making the weight average fiber length of the fibrous filler in the injection molded body large, it is preferred to carry out injection molding using long fiber pellets with a same length as a length of the fibrous filler. However, even if long fiber pellets are used, if the injection molding is carried out by a usual method, because the thickness of a core layer in which the fibrous filler is oriented in a direction perpendicular to a flow direction of the thermoplastic resin composition becomes about 30-50% relatively to a thickness of a molded body, the influence of the core layer becomes strong, and because the strength of the molded body is different between at the skin layer and at the core layer, warping is generated in the injection molded body. In the injection molded body, since the thickness of the core layer can be suppressed to be 20% or less relatively to the thickness of the molded body by using the first method or the second method as described later, the influence of the core layer can be suppressed and the anisotropy of the properties can be suppressed, and an injection molded body with low warping can be obtained.

The thickness of the core layer is controlled at 20% or less relatively to the thickness of the injection molded body. The thickness of the core layer is determined as follow. The image data of the fibrous filler in the injection molded body are obtained using a 3D X-ray computed tomography scanner (type: TDM1000IS) supplied by Yamato Material Co., Ltd., after the obtained image data are binarized with respect to fibrous filler and thermoplastic resin using a 3D image processing software "TRI" series supplied by RATOC SYSTEM ENGINEERING CO., LTD., a primary orientation direction is calculated from the orientation directions of the respective fibers, and when the flow direction of the resin composition at the time of producing the molded body is set at 90° and a direction perpendicular to the flow direction of the resin composition is set at 0°, a part exhibiting 40° or less as its primary orientation direction is determined to be a core layer, and the thickness thereof is decided. Moreover, the orientation directions of the fibrous filler in the skin layer are determined as follow. The image data of the fibrous filler in the injection molded body are obtained using a 3D X-ray computed tomography scanner (type: TDM1000IS) supplied by Yamato Material Co., Ltd., after the obtained image data are binarized with respect to fibrous filler and thermoplastic resin using a 3D image processing software "TRI" series supplied by RATOC SYSTEM ENGINEERING CO., LTD., a primary orientation direction is calculated from the orientation directions of the respective fibers, and a condition where 40% or less of the whole of fibers are distributed within ±10° of the primary orientation direction is determined to be a random orientation condition.

Next, methods of the injection press molding (the first method and the second method) to produce the above-described injection molded body will be explained.

First, the first method of the injection press molding is a method of filling the fiber reinforced thermoplastic resin composition into the cavity at a predetermined mold opening state to form a skin layer and, thereafter, controlling the thickness of a core layer by flowing out the resin of the core layer by pressing (mold closing). As the molding machine used for the injection press molding, any type of known machines capable of injection pressing can be used, and a horizontal type and a vertical type can be both used.

The timing of starting pressing when the injection press molding is performed is important on account of controlling the thickness of the core layer and, from the viewpoint of controlling the thickness of the core layer relative to the thickness of the whole of the injection molded body, it is important to start pressing after filling of the resin at 80 vol. % or more of a main cavity volume of a mold before pressing is finished. Furthermore, it is preferred to use a mold for injection molding with a structure having a waste cavity into which the resin in the core layer, in which the fibrous filler is oriented in a direction perpendicular to the resin flow, is discharged outside the main cavity in the pressing step. This waste cavity preferably has a volume of 10 vol. % or more of the main cavity volume to be able to discharge (to be able to push out) the resin of the core layer sufficiently in the pressing step.

Figure 3:
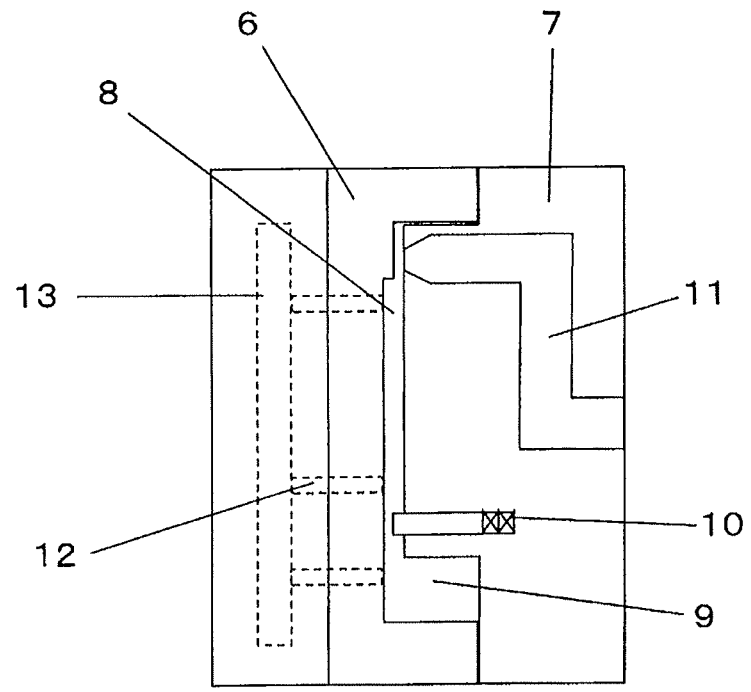
FIG. 3 is a schematic diagram showing an example of a structure of a mold used for injection press molding in a first method, and a schematic diagram of a mold which was used for estimation of properties in Examples.

Such a preferable mold structure used for the first method of injection molding and injection molding steps will be explained using FIGS. 3 to 7. FIG. 3 exemplifies a basic mold structure. As shown in FIG. 3, this mold comprises a movable side mold (6) and a fixed side mold (7), a main cavity (8) and a waste cavity (9) having a structure fitted to each other (called as "INRO" structure in Japanese), a spring-type movable insert die (10), a hot runner system (11), sticking-out pins (12) as ejectors for taking out a molded product from the cavity and an ejector plate (13).

Figure 4:
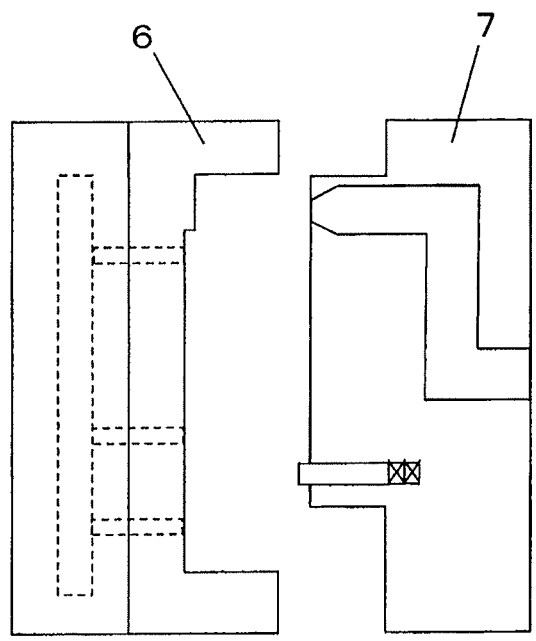
FIG. 4 is a schematic diagram showing a state where a mold is opened before injection molding, in injection press molding step in a first method.
Figure 5:
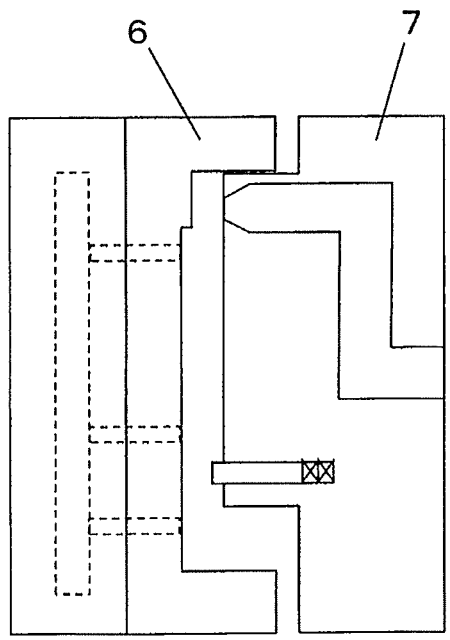
FIG. 5 is a schematic diagram showing a state where a mold is closed and a predetermined mold opening amount is kept, in injection press molding step in a fast method.
Figure 6:
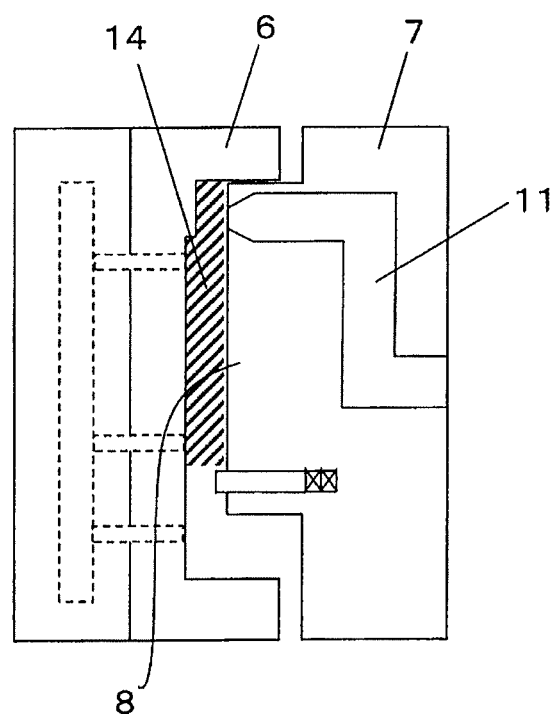
FIG. 6 is a schematic diagram showing carrying out of injection and filling at a state where a predetermined mold opening amount is kept, in injection press molding step in a first method.
Figure 7:
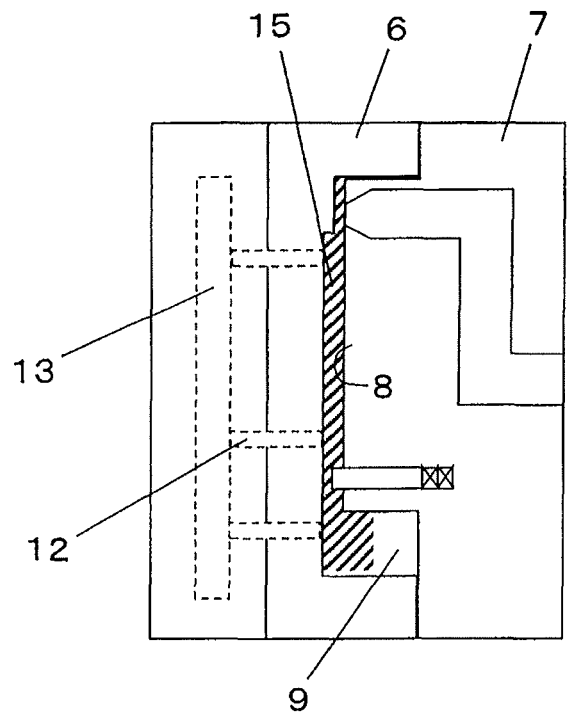
FIG. 7 is a schematic diagram showing a state where pressing is carried out and excessive resin composition is pushed out into a waste cavity, in injection press molding step in a first method.

Next, the steps of molding will be explained. As shown in FIG. 4, from a state where the mold is opened, the mold closing is started by moving the movable side mold (6). Next, as shown in FIG. 5, it is stopped at a predetermined mold opening amount, and injection is started. Next, as shown in FIG. 6, fiber reinforced thermoplastic resin (14) is charged (filled) into the cavity (8) through the hot runner system (11). Thereafter, as shown in FIG. 7, pressing is started, a part of the filled fiber reinforced thermoplastic resin is pushed out into the waste cavity (9) and, after cooling and solidifying, an injection molded body (15) is taken out using the ejectors (12) and the ejector plate (13).

In the injection molded body obtained by such a first method, because the anisotropy of properties is small, a part peculiarly low in strength does not exist, and a stable product strength and an extremely low warping property are exhibited.

Next, the second method of the injection press molding will be explained.

Similarly to the above-described first method, the second method of the injection press molding is a method of filling (injecting) the fiber reinforced thermoplastic resin composition into the cavity at a predetermined mold opening state to form a skin layer and, thereafter, controlling the thickness of a core layer by flowing out the resin of the core layer by pressing (mold closing). As the molding machine used for the injection press molding, any type of known machines capable of injection pressing can be used, and a horizontal type and a vertical type can be both used.

The timing of starting pressing when the injection press molding is performed is important on account of controlling the thickness of the core layer and, in the second method, the injection molding is carried out by injection press molding in which a mold is started to be closed after injection is started. At that time, from the viewpoint of controlling the thickness of the core layer relatively to the thickness of the whole of the injection molded body, injection molding and mold closing (pressing) are carried out at timings such that, when a difference between a time of starting injection (tis) and a time of starting pressing (a time of starting to close a mold) (tps) is referred to as t0, a difference between the time of starting pressing (tps) and a time of finishing injection (tif) is referred to as t1, and a difference between the time of finishing injection (tif) and a time of finishing pressing (tpf) is referred to as t2, a ration (t2/t1) of t2 to t1 becomes 1.1 or more. It is further preferred to make t0/t1 greater than 1.1. Further, a method of starting pressing (mold closing) after finishing injection (FIG. 14 described later) may be employed.

Figure 8:
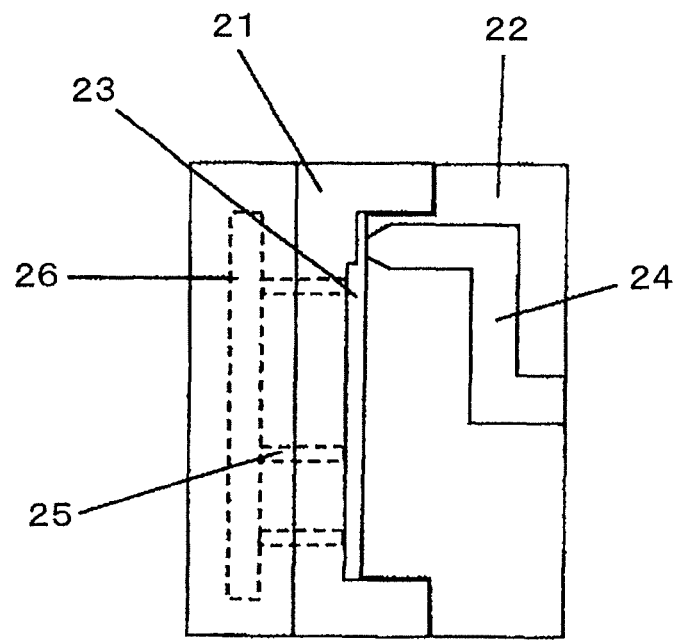
FIG. 8 is a schematic diagram showing an example of a structure of a mold used for injection press molding in a second method, and a schematic diagram of a mold which was used for estimation of properties in Examples.

A preferable mold structure used for the second method of injection molding and injection molding steps will be explained using FIGS. 8 to 12. FIG. 8 exemplifies a basic mold structure. As shown in FIG. 8, this mold comprises a movable side mold (21) and a fixed side mold (22), a cavity (23) having a structure fitted to each other (called as "INRO" structure in Japanese), a hot runner system (24), sticking-out pins (25) as ejectors for taking out a molded product from the cavity and an ejector plate (26).

Figure 9:
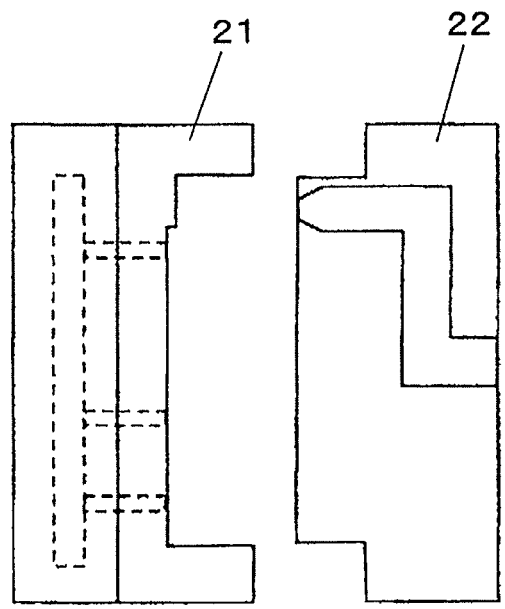
FIG. 9 is a schematic diagram showing a state where a mold is opened before injection molding, in injection press molding step in a second method.
Figure 10:
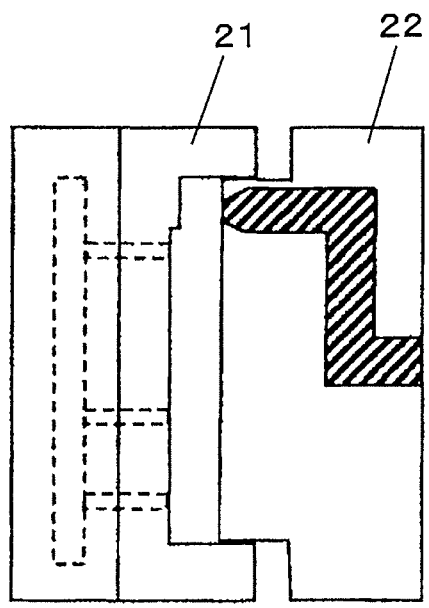
FIG. 10 is a schematic diagram showing a state where a mold is closed, a predetermined mold opening amount is kept and injection is started, in injection press molding step in a second method.
Figure 11:
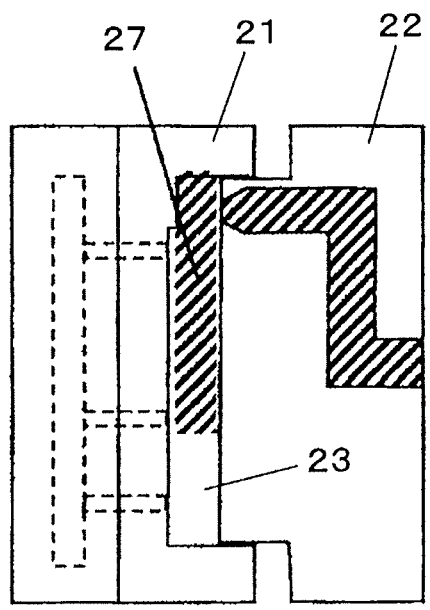
FIG. 11 is a schematic diagram showing carrying out of injection and filling at a state where a predetermined mold opening amount is kept, and start of pressing, in injection press molding step in a second method.
Figure 12:
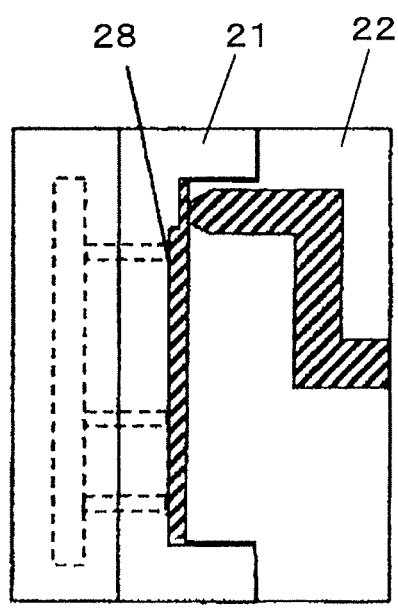
FIG. 12 is a schematic diagram showing carrying out of injection and filling at a state where a predetermined mold opening amount is kept, and finish of pressing, in injection press molding step in a second method.

Next, the steps for molding in the above-described second method will be explained. As shown in FIG. 9, from a state where the mold is opened, the mold closing is started by moving the movable side mold (21). Next, as shown in FIG. 10, it is stopped at a predetermined mold opening amount, and injection is started through the hot runner system (24). Next, as shown in FIG. 11, fiber reinforced thermoplastic resin composition (27) is charged (filled) into the cavity (23). Thereafter, as shown in FIG. 12, mold closing is started, the filled fiber reinforced thermoplastic resin is made to be flowed, and after cooling and solidifying, an injection molded body (28) is taken out using the ejectors (25) and the ejector plate (26).

Thus, also in the injection molded body obtained by the second method, because the anisotropy of properties is small, a part peculiarly low in strength does not exist, and a stable product strength and an extremely low warping property are exhibited.

Figure 13:
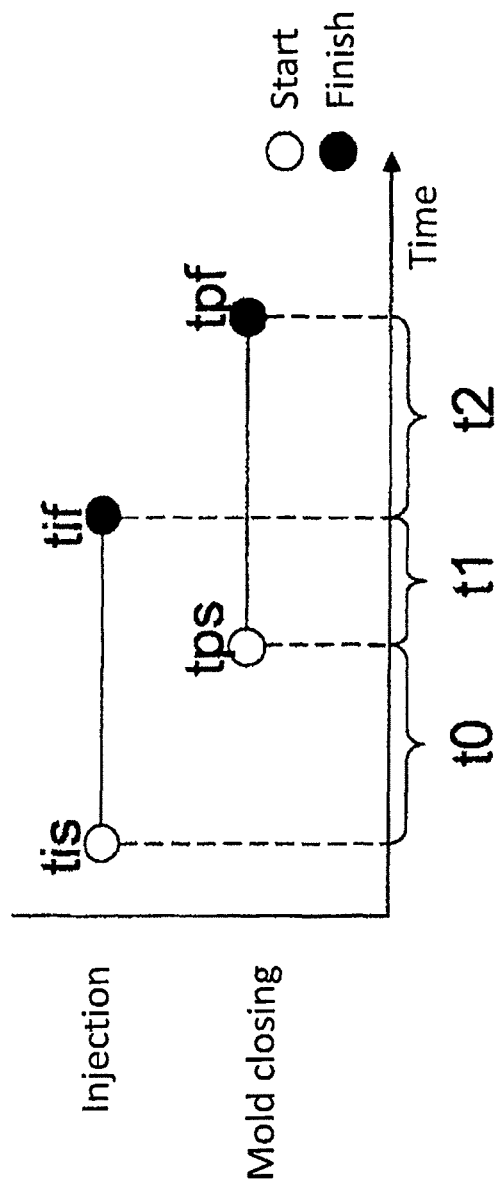
FIG. 13 is a diagram showing a timing at which injection is finished after starting mold closing, in injection press molding step in a second method.
Figure 14:
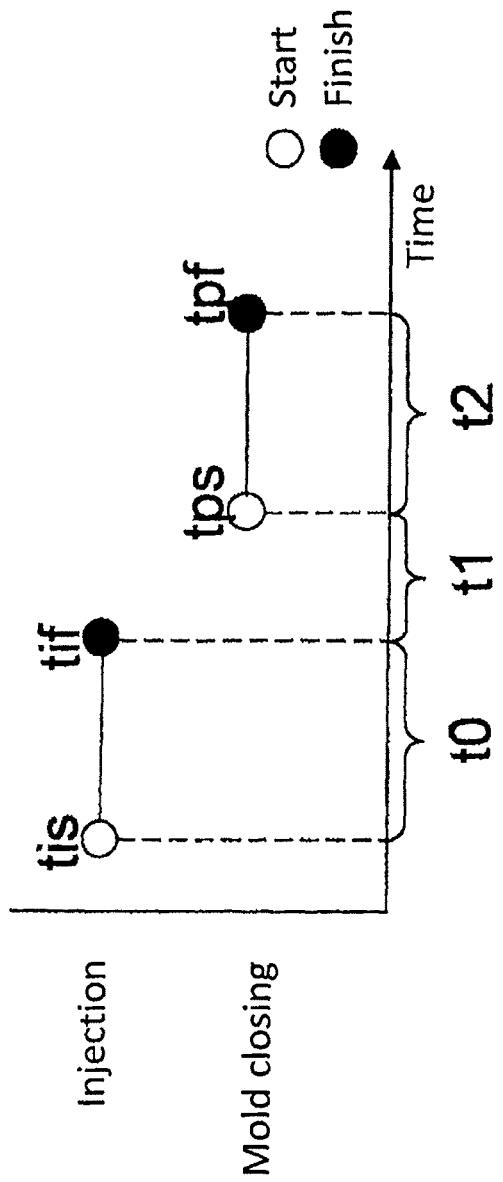
FIG. 14 is a diagram showing a timing at which mold closing is started after finishing injection, in injection press molding step in a second method.

The timings of injection and start and finish of mold closing in the above-described second method can be expressed as shown in FIG. 13 or FIG. 14.

As the thermoplastic resin (a), although it is not particularly restricted, for example, can be usefully used a polyethylene or polypropylene resin, a polystyrene resin, an ABS resin, a polyacetal resin, a polycarbonate resin, a Nylon resin, a PBT (polybutylene terephthalate) resin, a PET (polyethylene terephthalate) resin, a PPS (polyphenylene sulfide) resin, an LCP (liquid crystal polyester) resin, a PEEK (polyetheretherketone) resin and the like, and further, a blend of two kinds or more thereof may be used.

Further, as the fibrous filler (b), in the first method, one having a diameter (fiber diameter) of 1 to 20 µm is preferable. If the fiber diameter is less than 1 µm, the dispersion becomes poor, and if more than 20 µm, the foreign matter effect becomes strong and the strength is reduced, and therefore, such conditions are not preferred. More preferably, the fiber diameter in a range of 5 to 15 µm is desirable from the viewpoint of balance between dispersion and reinforcement effect. Further, in the second method, fibrous filler having a diameter (fiber diameter) of 1 to 30 µm is preferable. If the fiber diameter is less than 1 µm, the dispersion becomes poor and, if more than 30 µm, the foreign matter effect becomes strong and the strength is reduced and, therefore, such conditions are not preferred. More preferably, the fiber diameter in a range of 3 to 15 µm is desirable from the viewpoint of balance between dispersion and reinforcement effect.

Further, usually, molding is carried out by forming the fiber reinforced thermoplastic resin composition into pellets. The pellets comprising the fiber reinforced thermoplastic resin composition can be produced the following methods and the like:

(1) method of blending thermoplastic resin (a) and fibrous filler (b) and melt extruding the blend
(2) method of drawing after dipping continuous fibrous filler (b) in molten thermoplastic resin (a) and impregnating the resin
(3) method of coating thermoplastic resin (a) around continuous fibrous filler (b) and cutting
(4) method of coating thermoplastic resin (a) around continuous fibrous filler (b) and impregnating the resin by twisting the continuous fibers.

In particular, to control the weight average fiber length of the fibrous filler in the injection molded body at 300 μm or more, it is preferred to use pellets obtained by a method of drawing after dipping continuous fibrous filler (b) in thermoplastic resin (a) and impregnating the resin, a method of coating thermoplastic resin (a) around continuous fibrous filler (b) and cutting, a method of coating thermoplastic resin (a) around continuous fibrous filler (b) and impregnating the resin by twisting the continuous fibers, or a method of coating thermoplastic resin (a) around continuous fibrous filler (b) after pre-impregnating a low-viscosity resin or the like thereinto and cutting.

As the fibrous filler (b), although carbon fibers, glass fibers, aramide fibers, wholly aromatic polyamide fibers, metal fibers and the like can be exemplified, carbon fibers, glass fibers and aramide fibers are preferred.

As the carbon fibers, for example, polyacrylonitrile (PAN) based, pitch based, cellulose based and the like can be exemplified. Among these, PAN based carbon fibers excellent in strength and elastic modulus are preferable.

As the PAN based carbon fibers, carbon fibers having a tensile elongation at breakage of 1.0% or more are preferred. In the case where the tensile elongation at breakage is less than 1.0%, breakage of carbon fibers is liable to occur in the process of producing the resin composition or in the injection molding process, it is difficult to make the fiber length of carbon fibers left in the molded body long, and the mechanical properties of the molded body become poor.

Further, particularly to solve the aforementioned problems in the conventional technologies more securely, the above-described tensile elongation at breakage of carbon fibers is preferably 1.5% or more, more preferably 1.7% or more, and further preferably 1.9% or more. Although there is no upper limit for the tensile elongation at breakage of PAN based carbon fibers used, generally it is less than 5%.

As a method for spinning such PAN based carbon fibers, wet spinning, dry-wet spinning or the like can be exemplified, and arbitrary spinning method can be selected depending upon required properties.

As the glass fibers used, although any glass fibers generally sold on the market can be used, for example, E-glass fibers are preferred from the viewpoints of cost and performance.

It is possible to give an affinity with the thermoplastic resin (a) to the fibrous filler (b) by surface treatment. For example, silane based coupling agent, borane based coupling agent, titanate based coupling agent and the like can be used, and as the silane based coupling agent, amino-silane based coupling agent, epoxy-silane based coupling agent, or acryl-silane based coupling agent can be used.

Although preferably the fiber reinforced thermoplastic resin composition prepared as pellets is injection molded, the shape of the pellets is not particularly restricted, and in the first method, as the length of the pellets, for example, usually a range of 3 to 15 mm can be employed. If the length of the pellets is too small, the length of fibers left in an injection molded body becomes small, the orientation of fibers in the skin layer in a resin flow direction becomes strong, there is a fear that an isotropy is generated and the strength and the impact resistance are reduced. Further, if the length of the pellets is too great, because there is a case where they are not properly fed into a molding machine, the length of the pellets is preferably 3 to 12 mm, and more preferably 6 to 10 mm. Further, in the second method, for example, long fiber pellets with a length of 3 to 30 mm can be used. Similarly to the above description, if the length of the pellets is too small, the length of fibers left in an injection molded body becomes small, the orientation of fibers in the skin layer in a resin flow direction becomes strong, there is a fear that an isotropy is generated and the strength and the impact resistance are reduced. Further, if the length of the pellets is too great, because there is a case where they are not properly fed into a molding machine, the length of the pellets is preferably 3 to 20 mm, and more preferably 4 to 20 mm.

Further, to the fiber reinforced thermoplastic resin composition, in accordance with use, various additives, for example, a known additive such as a dispersant, a lubricant, a plasticizer, an antioxidant, an antistatic agent, an optical stabilizer, a ultraviolet absorbent, a metal deactivator, a crystallization accelerator, a foaming agent, a colorant, a cross linking agent or an antibacterial agent can be added.

Although the content of the fibrous filler (b) is not particularly restricted, in the first method, for example, 5 parts by weight to 50 parts by weight relatively to 100 parts by weight of the thermoplastic resin (a) is suitable. If it is less than 5 parts by weight, even if the core layer is controlled, the control does not greatly affect the strength, and if more than 50 parts by weight, reduction of moldability ascribed to increase in viscosity is great, and it becomes difficult to make the core layer thin in the injection press molding. 10 parts by weight to 40 parts by weight is more preferable from the viewpoints of electric conductivity, mechanical strength and economy of an obtained injection molded body. Further, in the second method, 3 parts by weight to 50 parts by weight relative to 100 parts by weight of the thermoplastic resin (a) is suitable. Similarly to the above description, if it is less than 3 parts by weight, even if the core layer is controlled, the control does not greatly affect the strength, and if more than 50 parts by weight, reduction of moldability ascribed to increase in viscosity is great, and it becomes difficult to make the core layer thin in the injection press molding. 5 parts by weight to 40 parts by weight is more preferable from the viewpoints of mechanical strength, economy and electric conductivity of an injection molded body.

EXAMPLES

Hereinafter, our injection molded bodies and methods will be explained more concretely with Examples. The estimations of material properties were carried out based on the following methods.

Flexural Elastic Modulus

Figure 15:
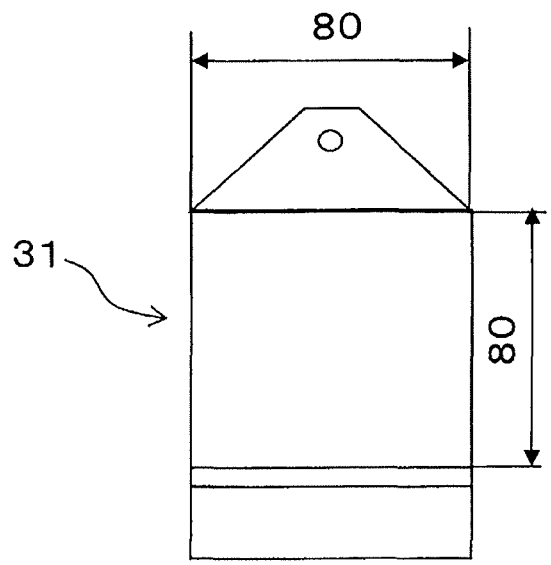
FIG. 15 is a diagram showing a shape of an injection molded body to estimate properties.

A test piece was cut out at a strip form with a width of 15 mm and a length of 80 mm from a central part of a test piece 31 with a size of 80 mm×80 mm×2 mm thickness shown in FIG. 15, which was obtained by an injection press molding machine (J110AD, supplied by The Japan Steel Works, LTD.), and flexural examination was carried out based on. ISO 178 by a 5566 type test machine (supplied by Instron) to obtain a flexural elastic modulus (GPO.

Determination of Thickness of Core Layer

A test piece was cut out at a form of 5 mm square from a central part of the test piece with a size of 80 mm×80 mm×2 mm thickness prepared by the above-described method, and using a 3D X-ray computed tomography scanner (type: TDM1000IS) supplied by Yamato Material Co., Ltd., the image data of the fibrous filler in the injection molded body were obtained.

After the obtained image data are binarized with respect to fibrous filler and thermoplastic resin using a 3D image processing software "TRI" series supplied by RATOC SYSTEM ENGINEERING CO., LTD., a primary orientation direction is calculated from the orientation directions of the respective fibers.

When the resin flow direction was set at 90° and a direction perpendicular to the resin flow direction was set at 0°, a part exhibiting 40° or less as its primary orientation direction was determined to be a core layer.

Distribution of Fiber Length

A test piece was cut out at a size of 20 mm×20 mm from a central part of the test piece with a size of 80 mm×80 mm×2 mm thickness prepared by the above-described method, and by burning it to ashes at 500° C. for 2 hours, the carbon fibers in the molded product were taken out. The carbon fibers taken out were put into a beaker with 3 liters of water, and the carbon fibers were uniformly dispersed in water using a ultrasonic washer. Ice of the aqueous solution dispersed uniformly with carbon fibers was sucked up by a pipette having a tip diameter of 8 mm, and after it was sampled into a Petri dish having a depression of 10×10 mm, it was dried. A photograph of the carbon fibers in the Petri dish was taken, and measuring the lengths of about 1000 fibers, an average fiber length was calculated. The equation for the calculation is as follows:

Weight average fiber length=$\Sigma(Mi^2 \times Ni)/\Sigma(Mi \times Ni)$

Mi: fiber length (mm)
Ni: number of fibers.

Amount of Warping

Figure 16:
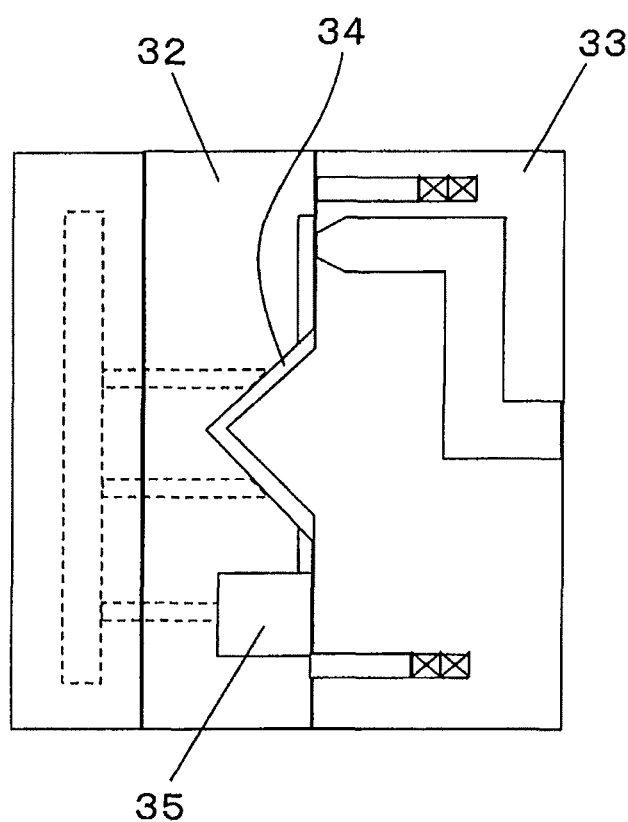
FIG. 16 is a schematic diagram showing a structure of a mold for molding a molded body to determine an amount of warping.
Figure 17:
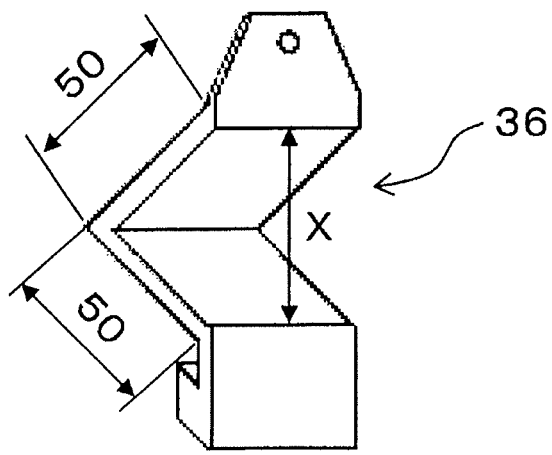
FIG. 17 is a schematic perspective view of a molded body to determine an amount of warping.

Using an L-shaped mold having a movable side mold 32, a fixed side mold 33, a main cavity 34 and a waste cavity 35 shown in FIG. 16, a molded body 36 having a shape shown in FIG. 17 was molded by "J1110AD" supplied by The Japan Steel Works, LTD., a regular dimension to be molded, 70.7 mm, and a dimension X (mm) of the molded body 36 indicated in FIG. 17 were measured, and the amount of warping (mm) was calculated by the following equation:

Amount of warping(*mm*)=70.7-*X*.

First, Examples of the first method will be explained below.

Example 1

First, PAN based continuous carbon fiber bundles as the fibrous filler (b) were heated, and a molten resin was measured and applied thereto by a gear pump. Then, the resin was impregnated into the carbon fiber bundles in an atmosphere heated at a temperature higher than the temperature for melting, and a composite of the continuous carbon fiber bundles and the resin was obtained (impregnation step).

Next, the thermoplastic resin (a) was deposited into a hopper of an extruder, and by extruding it to a coating die at a melt-kneaded condition and at the same time supplying the above-described composite continuously into the coating die, the resin composition comprising the thermoplastic resin (a) was coated to the composite, and by controlling the discharge amount of the extruder and the supply amount of the composite, continuous fiber reinforced resin strands with a carbon fiber content of 20 wt. % were obtained (coating step).

Thereafter, the above-described continuous fiber reinforced resin strands were cooled and solidified, and they were cut at a length of 6.0 mm using a cutter to obtain sheath-core type long fiber pellets.

Figure 18:
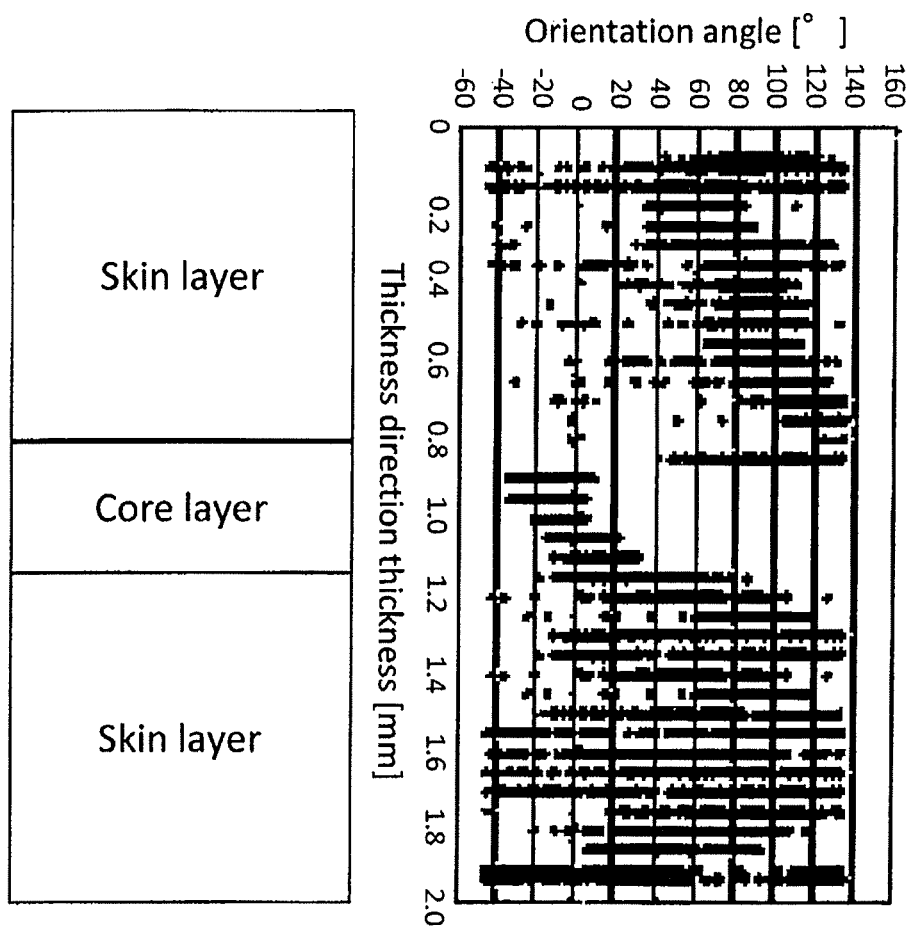
FIG. 18 is a diagram showing a result of determining orientation of fibers of an injection molded body in Example 1.

The result of estimation of the molded body injection press molded using these pellets was excellent in mechanical properties and amount of warping as shown in Table 1. Further, the result of measuring the orientation of fibers of the injection molded body of this Example 1 is shown in FIG. 18.

Examples 2-5 and Comparative Examples 1-3

Figure 19:
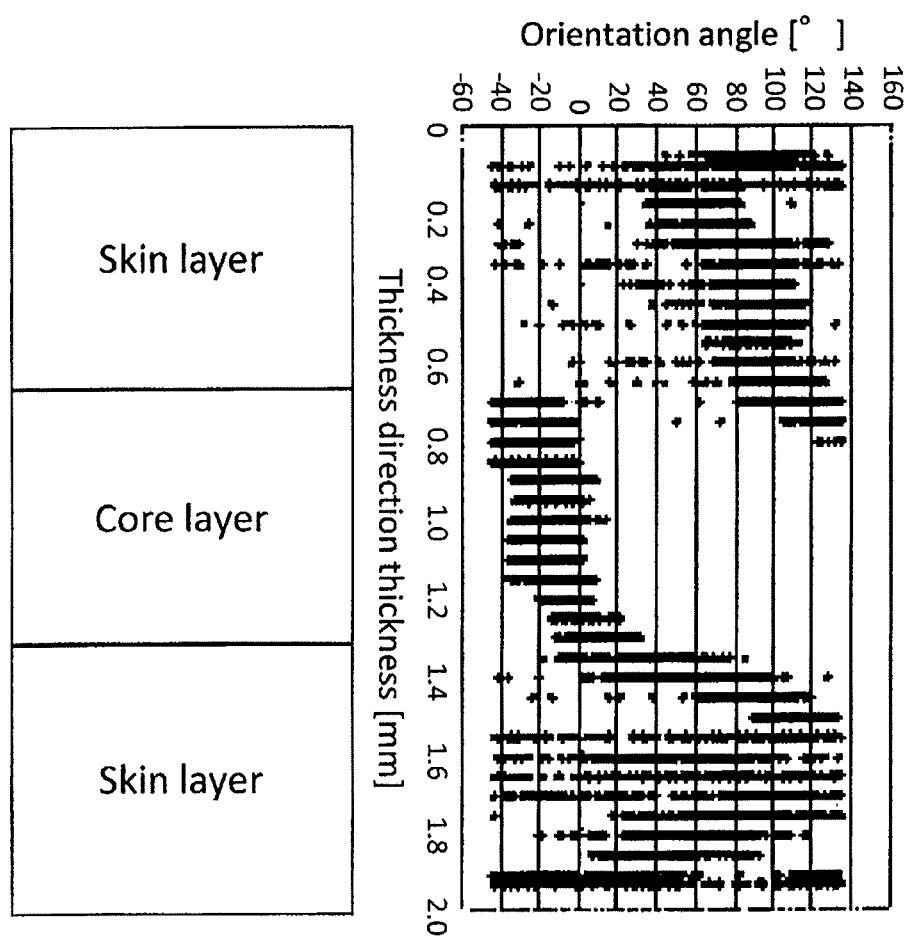
FIG. 19 is a diagram showing a result of determining orientation of fibers of an injection molded body in Comparative Example 1.

Moldings were carried out using the long fiber pellets obtained in Example 1 at the same condition as that in Example 1 other than changing molding conditions to those shown in Table 1. The results of estimations of these molded bodies are shown in Table 1. These Examples were excellent in mechanical properties and amount of warping as compared with Comparative Examples 1-3. Further, the result of measuring the orientation of fibers of the injection molded body of Comparative Example 1 is shown in FIG. 19.

Example 6

The same condition as that in Example 2 was employed other than changing the content of carbon fibers of the continuous fiber reinforced resin strands to 30 wt %. The result of estimation of this molded body was excellent in mechanical properties and amount of warping as shown in Table 1.

Comparative Example 4

Figure 20:
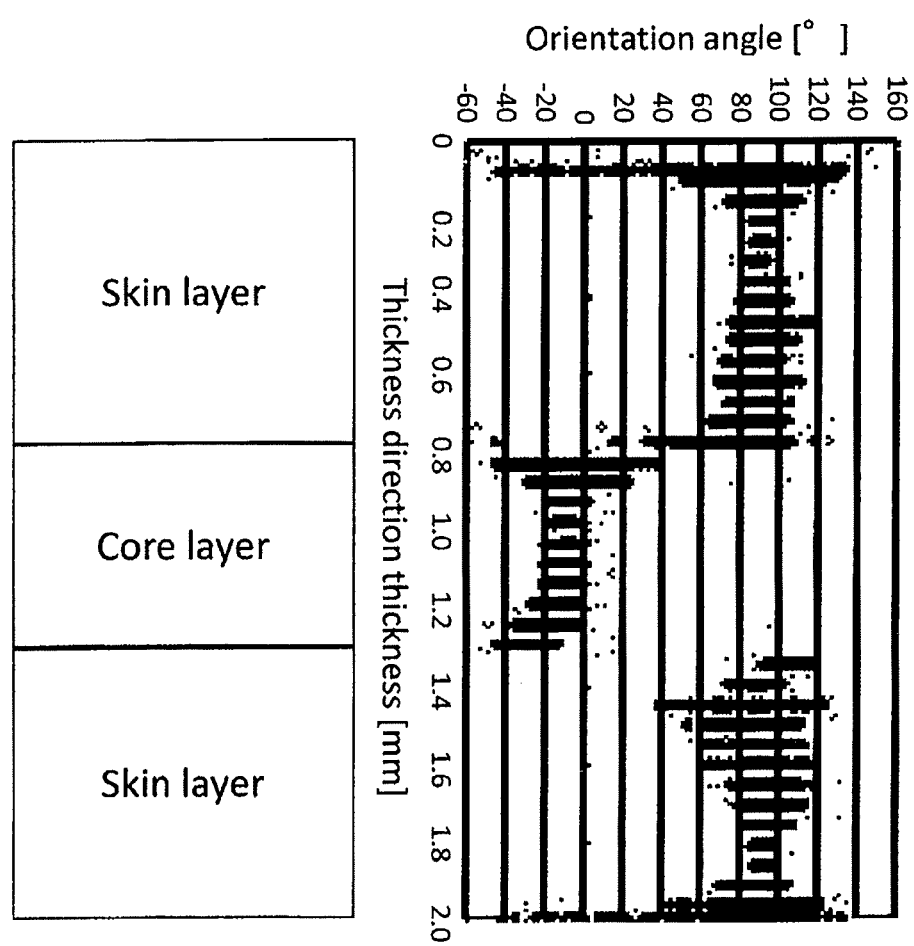
FIG. 20 is a diagram showing a result of determining orientation of fibers of an injection molded body in Comparative Example 4.

The thermoplastic resin (a) was deposited into a main hopper of a twin-screw extruder ("TEX30α" supplied by JSW Corporation (The Japan Steel Works, LTD.)), chopped strands of the fibrous filler (b) were supplied from the side of the extruder at an amount of 20 wt. % relatively to 100 of the thermoplastic resin (a), they were extruded in a gut-like form after being melt kneaded at 260° C., the extruded materials were cooled and solidified, and they were cut at a length of 3.0 mm using a cutter to obtain short fiber pellets. The result of estimation of the injection molded body using these pellets is shown in Table 1, and the mechanical properties were low and the anisotropy was high. Further, the amount of warping was great. Furthermore, the result of measuring the orientation of fibers of the injection molded body of this Comparative Example 4 is shown in FIG. 20.

Examples 7-9 and Comparative Examples 5 and 6

Long fiber pellets were obtained at the same condition as that in Example 1 other than changing the thermoplastic resin (a) to polypropylene. Using these long fiber pellets, molded bodies were obtained by molding at the conditions shown in Table 2. The results of these molded bodies are shown in Table 2, and these Examples were excellent in mechanical properties and amount of warping as compared with Comparative Examples 5 and 6.

Examples 10-12 and Comparative Examples 7 and 8

Long fiber pellets were obtained at the same condition as that in Example 1 other than changing the thermoplastic resin (a) to PPS resin. Using these long fiber pellets, molded bodies were obtained by molding at the conditions shown in Table 2. The results of these molded bodies are shown in Table 2, and these Examples were excellent in mechanical properties and amount of warping as compared with Comparative Examples 7 and 8.

Examples 13-15 and Comparative Examples 9 and 10

Long fiber pellets were obtained at the same condition as that in Example 1 other than changing the fibrous filler (b) to glass fibers and setting the content of the glass fibers at 30 wt. %. Using these long fiber pellets, molded bodies were obtained by molding at the conditions shown in Table 3. The results of these molded bodies are shown in Table 3, and these Examples were excellent in mechanical properties and amount of warping as compared with Comparative Examples 9 and 10.

The thermoplastic resins (a) used in the above-described Examples and Comparative Examples are as follows:
Nylon 6 resin: "AMILAN" CM1001 supplied by Toray Industries, Inc.
Polypropylene resin: "Prime Polypro" J137 supplied by Prime Polymer Co., Ltd.
PPS resin: "TORELINA" M2888 supplied by Toray Industries, Inc.

Similarly, the fibrous fillers (b) are as follows:
Carbon fibers: "TORAYCA" T700S supplied by Toray Industries, Inc. (diameter: 7 μm, PAN based carbon fibers)
Glass fibers: RS240QR483 supplied by Nitto Boseki Co., Ltd. (diameter: 17 μm, E-glass).

TABLE 1

| Item | | Unit | Example 1 | Example 2 | Example 3 | Example 4 | Example 5 |
|---|---|---|---|---|---|---|---|
| Thermoplastic resin | Nylon 6 | Part by weight | 80 | 80 | 80 | 80 | 80 |
| | Polypropylene | | | | | | |
| | PPS | | | | | | |
| Fibrous filler | Carbon fiber | Part by weight | 20 | 20 | 20 | 20 | 20 |
| | Glass fiber | Part by weight | | | | | |
| Pellet length | | mm | 6 | 6 | 6 | 6 | 6 |
| Thickness of molded product | | mm | 2 | 2 | 2 | 2 | 2 |
| Temperature for molding | | °C. | 260 | 260 | 260 | 260 | 260 |
| Temperature of mold | | °C. | 80 | 80 | 80 | 80 | 80 |
| Time for filling | | sec | 2 | 2 | 2 | 2 | 2 |
| Back pressure | | MPa | 5 | 10 | 15 | 10 | 10 |
| Amount of mold opening | | mm | 1 | 1 | 1 | 2 | 1 |
| Timing for starting press | | — | After finish of filling | After finish of filling | After finish of filling | After finish of filling | After finish of filling |
| Cavity filling amount at starting press | | % | 95 | 95 | 95 | 95 | 80 |
| Thickness of core layer | | % | 10 | 10 | 10 | 5 | 12.5 |
| Weight average fiber length | | μm | 1600 | 900 | 600 | 900 | 900 |
| Flexural elastic modulus | MD | GPa | 8.8 | 8.4 | 7.3 | 8.5 | 9.0 |
| | TD | GPa | 7.2 | 7.1 | 6.9 | 8.2 | 7.1 |
| Amount of warping | | mm | 1.5 | 1.8 | 2.0 | 0.8 | 1.8 |

| Item | | Unit | Example 6 | Comparative example 1 | Comparative example 2 | Comparative example 3 | Comparative example 4 |
|---|---|---|---|---|---|---|---|
| Thermoplastic resin | Nylon 6 | Part by weight | 70 | 80 | 80 | 80 | 80 |
| | Polypropylene | | | | | | |
| | PPS | | | | | | |
| Fibrous filter | Carbon fiber | Part by weight | 30 | 20 | 20 | 20 | 20 |
| | Glass fiber | Part by weight | | | | | |
| Pellet length | | weight | 6 | 6 | 6 | 6 | 3 |
| Thickness of molded product | | mm | 2 | | | | |
| Temperature for molding | | mm | 260 | 260 | 260 | 260 | 260 |
| Temperature of mold | | °C. | 80 | 80 | 80 | 80 | 80 |
| Time for filling | | °C. | 2 | 2 | 2 | 2 | 2 |
| Back pressure | | sec | 10 | 10 | 10 | 10 | 10 |
| Amount of mold opening | | MPa | 1 | 0 | 2 | 2 | 2 |
| Time for starting press | | mm | After finish of filling — | None | Starting press simultaneously with starting injection | After finish of filling | After finish of filling |
| Cavity filling amount at starting press | | % | 95 | — | 0 | 50 | 95 |
| Thickness of core layer | | % | 15 | 30 | 30 | 25 | 10 |
| Weight average fiber length | | μm | 700 | 900 | 900 | 900 | 200 |
| Flexural elastic modulus | MD | GPa | 13.8 | 10.2 | 9.9 | 9.5 | 6.5 |
| | TD | GPa | 12.1 | 6.2 | 6.5 | 7.2 | 4.3 |
| Amount of warping | | mm | 1.5 | 3.5 | 3.5 | 3.9 | 4.5 |

TABLE 2

| Item | | Unit | Example 7 | Example 8 | Example 9 | Comparative example 5 | Comparative example 6 |
|---|---|---|---|---|---|---|---|
| Thermoplastic resin | Nylon 6 | Part by weight | 80 | 80 | 80 | 80 | 80 |
| | Polypropylene | | | | | | |
| | PPS | | | | | | |
| Fibrous filler | Carbon fiber | Part by weight | 20 | 20 | 20 | 20 | 20 |
| | Glass fiber | Part by weight | | | | | |
| Pellet length | | mm | 6 | 6 | 6 | 6 | 6 |
| Temperature for molding | | ° C. | 260 | 260 | 260 | 260 | 260 |
| Temperature of mold | | ° C. | 80 | 80 | 80 | 80 | 80 |
| Time for filling | | sec | 2 | 2 | 2 | 2 | 2 |
| Back pressure | | MPa | 5 | 10 | 15 | 10 | 10 |
| Amount of mold opening | | mm | 1 | 1 | 1 | 0 | 1 |
| Timing for starting press | | — | After finish of filling | After finish of filling | After finish of filling | None | After finish of filling |
| Cavity filling amount at starting press | | % | 95 | 95 | 95 | — | 50 |
| Thickness of core layer | | % | 10 | 10 | 10 | 30 | 25 |
| Weight average fiber length | | μm | 1800 | 1200 | 800 | 1200 | 1200 |
| Flexural elastic modulus | MD | GPa | 7.6 | 7.8 | 7.9 | 8.8 | 8.1 |
| | TD | GPa | 7.2 | 6.9 | 6.6 | 5.8 | 6.4 |
| Amount of warping | | mm | 2.1 | 2.4 | 2.8 | 5.5 | 4.4 |

| Item | | Unit | Example 10 | Example 11 | Example 12 | Comparative example 7 | Comparative example 8 |
|---|---|---|---|---|---|---|---|
| Thermoplastic resin | Nylon 6 | Part by weight | | | | | |
| | Polypropylene | | | | | | |
| | PPS | | 80 | 80 | 80 | 80 | 80 |
| Fibrous filter | Carbon fiber | Part by weight | 20 | 20 | 20 | 20 | 20 |
| | Glass fiber | Part by weight | | | | | |
| Pellet length | | mm | 6 | 6 | 6 | 6 | 6 |
| Temperature for molding | | ° C. | 320 | 320 | 320 | 320 | 320 |
| Temperature of mold | | ° C. | 130 | 130 | 130 | 130 | 130 |
| Time for filling | | sec | 2 | 2 | 2 | 2 | 2 |
| Back pressure | | MPa | 5 | 10 | 15 | 10 | 10 |
| Amount of mold opening | | mm | 1 | 1 | 1 | 0 | 1 |
| Time for starting press | | — | After finish of filling | After finish of filling | After finish of filling | None | After finish of filling |
| Cavity filling amount at starting press | | % | 0 | 50 | 95 | — | 50 |
| Thickness of core layer | | % | 10 | 10 | 10 | 30 | 25 |
| Weight average fiber length | | μm | 1400 | 700 | 500 | 700 | 1200 |
| Flexural elastic modulus | MD | GPa | 10.4 | 10.8 | 11.1 | 12.6 | 7.8 |
| | TD | GPa | 9.2 | 8.9 | 8.5 | 7.3 | 6.9 |
| Amount of warping | | mm | 1.1 | 1.3 | 1.6 | 2.8 | 2.4 |

TABLE 3

| Item | | Unit | Example 13 | Example 14 | Example 15 | Comparative example 9 | Comparative example 10 |
|---|---|---|---|---|---|---|---|
| Thermoplastic resin | Nylon 6 | Part by weight | 70 | 70 | 70 | 70 | 70 |
| | Polypropylene | | | | | | |
| | PPS | | | | | | |
| Fibrous filler | Carbon fiber | Part by weight | | | | | |
| | Glass fiber | Part by weight | 30 | 30 | 30 | 30 | 30 |
| Pellet length | | mm | 6 | 6 | 6 | 6 | 6 |
| Temperature for molding | | ° C. | 260 | 260 | 260 | 260 | 260 |
| Temperature of mold | | ° C. | 80 | 80 | 80 | 80 | 80 |
| Time for filling | | sec | 2 | 2 | 2 | 2 | 2 |
| Back pressure | | MPa | 5 | 10 | 15 | 10 | 10 |
| Amount of mold opening | | mm | 2 | 2 | 2 | 0 | 1 |
| Timing for starting press | | — | After finish of filling | After finish of filling | After finish of filling | None | After finish of filling |
| Cavity filling amount at starting press | | % | 95 | 95 | 95 | — | 50 |
| Thickness of core layer | | % | 10 | 10 | 10 | 30 | 25 |
| Weight average fiber length | | μm | 2500 | 1600 | 1000.0 | 1200 | 1200 |

TABLE 3-continued

| Item | | Unit | Example 13 | Example 14 | Example 15 | Comparative example 9 | Comparative example 10 |
|---|---|---|---|---|---|---|---|
| Flexural elastic modulus | MD | GPa | 7.1 | 6.8 | 6.3 | 8.5 | 8.0 |
| | TD | GPa | 6.3 | 6.0 | 5.0 | 5.3 | 5.8 |
| Amount of warping | | mm | 2.1 | 2.4 | 2.7 | 4.2 | 3.6 |

Next, Examples of the second method will be explained below.

Example 16

First, PAN based continuous carbon fiber bundles as the fibrous filler (b) were heated, and a molten resin was measured and applied thereto by a gear pump. Then, the resin was impregnated into the carbon fiber bundles in an atmosphere heated at a temperature higher than the temperature for melting, and a composite of the continuous carbon fiber bundles and the resin was obtained (impregnation step).

Next, the thermoplastic resin (a) was deposited into a hopper of an extruder, and by extruding it to a coating die at a melt-kneaded condition and at the same time supplying the above-described composite continuously into the coating die, the resin composition comprising the thermoplastic resin (a) was coated to the composite, and by controlling the discharge amount of the extruder and the supply amount of the composite, continuous fiber reinforced resin strands with a carbon fiber content of 20 wt. % relatively to the sum with the thermoplastic resin (a) were obtained (coating step).

Thereafter, the above-described continuous fiber reinforced resin strands were cooled and solidified, and they were cut at a length of 6.0 mm using a cutter to obtain sheath-core type long fiber pellets.

Figure 21:
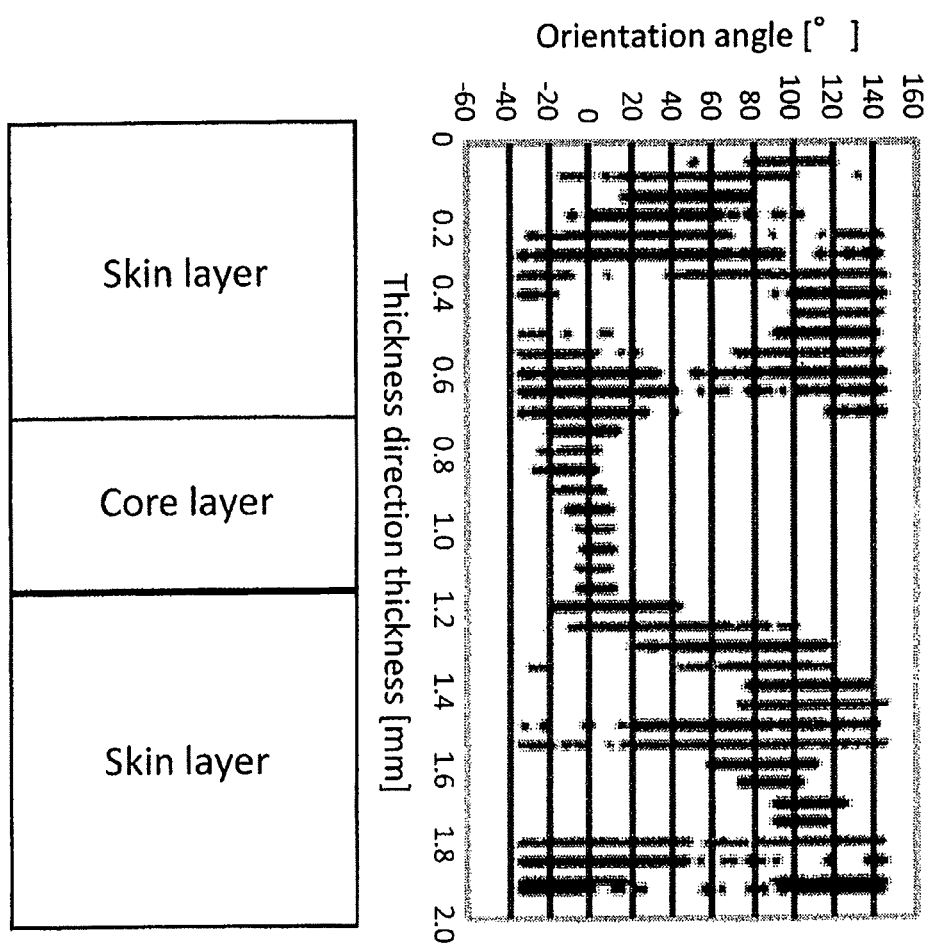
FIG. 21 is a diagram showing a result of determining orientation of fibers of an injection molded body in Example 16.

The molding condition at the time of being injection press molded using these pellets and the result of estimation of the obtained molded body are shown in Table 4. As understood from Table 4, our molded body obtained by the molding condition was excellent in mechanical properties and amount of warping. The result of measuring the orientation of fibers of the injection molded body of this Example 16 is shown in FIG. 21.

Examples 17-20 and Comparative Examples 11-13

Moldings were carried out using the long fiber pellets obtained in Example 16 at the same condition as that in Example 16 other than changing molding conditions to those shown in Table 4. The results of estimations of the obtained injection molded bodies are shown in Table 4. These Examples were excellent in mechanical properties and amount of warping as compared with Comparative Examples 11-13. As a result of measuring the orientation of fibers of the injection molded body of Comparative Example 11, a result approximately equal to the aforementioned one shown in FIG. 19 was obtained.

Example 21

The same condition as that in Example 17 was employed other than changing the content of carbon fibers of the above-described continuous fiber reinforced resin strands to 30 wt. % relative to the sum with the thermoplastic resin (a). The result of estimation of the obtained injection molded body was excellent in mechanical properties and amount of warping as shown in Table 4.

Comparative Example 14

The thermoplastic resin (a) was deposited into a main hopper of a twin-screw extruder ("TEX30α" supplied by JSW Corporation (The Japan Steel Works, LTD.)), chopped strands of the fibrous filler (b) were supplied from the side of the extruder at an amount of 20 wt. % relative to the sum with the thermoplastic resin (a), they were extruded in a gut-like form after being melt kneaded at 260° C., the extruded materials were cooled and solidified, and they were cut at a length of 3.0 mm using a cutter to obtain short fiber pellets. The result of estimation of the injection molded body using the obtained short fiber pellets is shown in Table 4, and the mechanical properties were low and the anisotropy was high. Further, the amount of warping was great. As a result of measuring the orientation of fibers of the injection molded body of this Comparative Example 14, a result approximately equal to the aforementioned one shown in FIG. 20 was obtained.

Examples 22-24 and Comparative Examples 15 and 16

Long fiber pellets were obtained at the same condition as that in Example 16 other than changing the thermoplastic resin (a) to polypropylene. Using the obtained long fiber pellets, injection molded bodies were obtained by injection press molding at the molding conditions shown in Table 5. The results of the obtained injection molded bodies are shown in Table 5, and Examples 22-24 were excellent in mechanical properties and amount of warping as compared to Comparative Examples 15 and 16.

Examples 25-27 and Comparative Examples 17 and 18

Long fiber pellets were obtained at the same condition as that in Example 1 other than changing the thermoplastic resin (a) to PPS resin. Using the obtained long fiber pellets, injection molded bodies were obtained by injection press molding at the molding conditions shown in Table 5. The results of the obtained injection molded bodies are shown in Table 5, and Examples 25-27 were excellent in mechanical properties and amount of warping as compared to Comparative Examples 17 and 1.8.

Examples 28-30 and Comparative Examples 19 and 20

Long fiber pellets were obtained at the same condition as that in Example 1 other than changing the fibrous filler (b) to glass fibers and setting the content of the glass fibers at 30 wt. %. Using the obtained long fiber pellets, injection molded bodies were obtained by injection press molding at the molding conditions shown in Table 6. The results of the obtained injection molded bodies are shown in Table 6, and Examples 28-30 were excellent in mechanical properties and amount of warping as compared to Comparative Examples 19 and 20.

The thermoplastic resins (a) used in the above-described Examples and Comparative Examples in the second method are as follows:

Nylon 6 resin: "AMILAN" CM1001 supplied by Toray Industries, Inc.
Polypropylene resin: "Prime Polypro" J137 supplied by Prime Polymer Co., Ltd.
PPS resin: "TORELINA" M12888 supplied by Toray Industries, Inc.

Similarly, the fibrous fillers (b) are as follows:
Carbon fibers: "TORAYCA" T700S supplied by Toray Industries, Inc. (diameter: 7 μm, PAN based carbon fibers)
Glass fibers: RS240QR483 supplied by Nitto Boseki Co., Ltd. (diameter: 17 μm, E-glass).

TABLE 4

| Item | | Unit | Example 16 | Example 17 | Example 18 | Example 19 | Example 20 |
|---|---|---|---|---|---|---|---|
| Thermoplastic resin (a) | Nylon 6 | Part by weight | 80 | 80 | 80 | 80 | 80 |
| | Polypropylene | | | | | | |
| | PPS | | | | | | |
| Fibrous filler (b) | Carbon fiber | Part by weight | 20 | 20 | 20 | 20 | 20 |
| | Glass fiber | Part by weight | | | | | |
| Pellet length | | mm | 6 | 6 | 6 | 6 | 6 |
| Thickness of molded product | | mm | 2 | 2 | 2 | 2 | 2 |
| Temperature for molding | | °C. | 260 | 260 | 260 | 260 | 260 |
| Temperature of mold | | °C. | 80 | 80 | 80 | 80 | 80 |
| Back pressure | | MPa | 5 | 10 | 15 | 10 | 10 |
| Amount of mold opening | | mm | 2 | 2 | 2 | 2 | 10 |
| Injection time | | sec | 1 | 1 | 1 | 1 | 1 |
| t0: Difference between time for starting injection (tis) and time for starting to close mold (tps) | | sec | 0.6 | 0.6 | 0.6 | 0.8 | 0.6 |
| t1: Difference between time for starting to close mold (tps) and time for finishing injection (tif) | | sec | 0.4 | 0.4 | 0.4 | 0.2 | 0.4 |
| t2: Difference between time for finishing injection (tif) and time for finishing to close mold (tpf) | | sec | 0.6 | 0.6 | 0.6 | 0.8 | 4.6 |
| t2/t1 | | | 1.5 | 1.5 | 1.5 | 4 | 11.5 |
| t0/t1 | | | 1.5 | 1.5 | 1.5 | 4 | 1.5 |
| Thickness of core layer | | % | 10 | 10 | 10 | 5 | 12.5 |
| Weight average fiber length | | μm | 1600 | 900 | 600 | 900 | 900 |
| Flexural elastic modulus | MD | GPa | 8.8 | 8.4 | 7.3 | 8.5 | 9.0 |
| | TD | GPa | 7.2 | 7.1 | 6.9 | 8.2 | 7.1 |
| Amount of warping | | mm | 1.5 | 1.8 | 2.0 | 1.8 | 1.8 |
| Remark | | | | | | | |

| Item | | Unit | Example 21 | Comparative example 11 | Comparative example 12 | Comparative example 13 | Comparative example 14 |
|---|---|---|---|---|---|---|---|
| Thermosplastic resin (a) | Nylon 6 | Part by weight | 70 | 80 | 80 | 80 | 80 |
| | Polypropylene | | | | | | |
| | PPS | | | | | | |
| Fibrous filler (b) | Carbon fiber | Part by weight | 30 | 20 | 20 | 20 | 20 |
| | Glass fiber | Part by weight | | | | | |
| Pellet length | | mm | 6 | 6 | 6 | 6 | 3 |
| Thickness of molded product | | mm | 2 | 2 | 2 | 2 | 2 |
| Temperature for molding | | °C. | 260 | 260 | 260 | 260 | 260 |
| Temperature of mold | | °C. | 80 | 80 | 80 | 80 | 80 |
| Back pressure | | MPa | 10 | 10 | 10 | 10 | 10 |
| Amount of mold opening | | mm | 2 | 0 | 2 | 1 | 2 |
| Injection time | | sec | 1 | 1 | 1 | 1 | 1 |
| t0: Difference between time for starting injection (tis) and time for starting to close mold (tps) | | sec | 0.6 | — | 0.2 | 0.5 | 0.6 |
| t1: Difference between time for starting to close mold (tps) and time for finishing injection (tif) | | sec | 0.4 | — | 0.8 | 0.5 | 0.4 |
| t2: Difference between time for finishing injection (tif) and time for finishing to close mold (tpf) | | sec | 0.6 | — | 0.2 | 0 | 0.6 |
| t2/t1 | | | 1.5 | — | 0.25 | 0 | 1.5 |
| t0/t1 | | | 1.5 | — | 0.25 | 1 | 1.5 |
| Thickness of core layer | | % | 15 | 35 | 30 | 30 | 10 |
| Weight average fiber length | | μm | 900 | 900 | 900 | 900 | 200 |
| Flexural elastic modulus | MD | GPa | 13.8 | 10.2 | 9.9 | 9.5 | 6.5 |
| | TD | GPa | 12.1 | 6.2 | 6.5 | 7.2 | 4.3 |

TABLE 4-continued

| | | | | | | |
|---|---|---|---|---|---|---|
| Amount of warping | mm | 1.2 | 3.5 | 3.5 | 3.9 | 4.5 |
| Remark | | | Only injection | | Finishing injection and finishing press are simultaneous | |

TABLE 5

| Item | | Unit | Example 22 | Example 23 | Example 24 | Comparative example 15 | Comparative example 16 |
|---|---|---|---|---|---|---|---|
| Thermoplastic resin (a) | Nylon 6 | Part by weight | | | | | |
| | Polypropylene | | 80 | 80 | 80 | 80 | 80 |
| | PPS | | | | | | |
| Fibrous filler (b) | Carbon fiber | Part by weight | 20 | 20 | 20 | 20 | 20 |
| | Glass fiber | Part by weight | | | | | |
| Pellet length | | mm | 6 | 6 | 6 | 6 | 6 |
| Thickness of molded product | | mm | 2 | 2 | 2 | 2 | 2 |
| Temperature for molding | | °C. | 260 | 260 | 260 | 260 | 260 |
| Temperature of mold | | °C. | 80 | 80 | 80 | 80 | 80 |
| Back pressure | | MPa | 5 | 10 | 15 | 10 | 10 |
| Amount of mold opening | | mm | 2 | 2 | 2 | 0 | 2 |
| Injection time | | sec | 1 | 1 | 1 | 1 | 1 |
| t0: Difference between time for starting injection (tis) and time for starting to close mold (tps) | | sec | 0.6 | 0.6 | 0.6 | — | 0.2 |
| t1: Difference between time for starting to close mold (tps) and time for finishing injection (tif) | | sec | 0.4 | 0.4 | 0.4 | — | 0.8 |
| t2: Difference between time for finishing injection (tif) and time for finishing to close mold (tpf) | | sec | 0.6 | 0.6 | 0.6 | — | 0.2 |
| t2/t1 | | | 1.5 | 1.5 | 1.5 | — | 0.25 |
| t0/t1 | | | 1.5 | 1.5 | 1.5 | — | 0.25 |
| Thickness of core layer | | % | 10 | 10 | 10 | 35 | 30 |
| Weight average fiber length | | μm | 1800 | 1200 | 800 | 1200 | 1200 |
| Flexural elastic modulus | MD | GPa | 7.6 | 7.8 | 7.9 | 8.8 | 8.1 |
| | TD | GPa | 7.2 | 6.9 | 6.6 | 5.8 | 6.4 |
| Amount of warping | | mm | 2.1 | 2.4 | 2.8 | 5.5 | 4.4 |
| Remark | | | | | | Only injection | |

| Item | | Unit | Example 25 | Example 26 | Example 27 | Comparative example 17 | Comparative example 18 |
|---|---|---|---|---|---|---|---|
| Thermosplastic resin (a) | Nylon 6 | Part by weight | | | | | |
| | Polypropylene | | | | | | |
| | PPS | | 80 | 80 | 80 | 80 | 80 |
| Fibrous filler (b) | Carbon fiber | Part by weight | 20 | 20 | 20 | 20 | 20 |
| | Glass fiber | Part by weight | | | | | |
| Pellet length | | mm | 6 | 6 | 6 | 6 | 6 |
| Thickness of molded product | | mm | 2 | 2 | 2 | 2 | 2 |
| Temperature for molding | | °C. | 320 | 320 | 320 | 320 | 320 |
| Temperature of mold | | °C. | 130 | 130 | 130 | 130 | 130 |
| Back pressure | | MPa | 5 | 10 | 15 | 10 | 10 |
| Amount of mold opening | | mm | 2 | 2 | 2 | 0 | 2 |
| Injection time | | sec | 1 | 1 | 1 | 1 | 1 |
| t0: Difference between time for starting injection (tis) and time for starting to close mold (tps) | | sec | 0.6 | 0.6 | 0.6 | — | 0.2 |
| t1: Difference between time for starting to close mold (tps) and time for finishing injection (tif) | | sec | 0.4 | 0.4 | 0.4 | — | 0.8 |
| t2: Difference between time for finishing injection (tif) and time for finishing to close mold (tpf) | | sec | 0.6 | 0.6 | 0.6 | — | 0.2 |
| t2/t1 | | | 1.5 | 1.5 | 1.5 | — | 0.25 |
| t0/t1 | | | 1.5 | 1.5 | 1.5 | — | 0.25 |
| Thickness of core layer | | % | 10 | 10 | 10 | 35 | 30 |

TABLE 5-continued

| | | | | | | |
|---|---|---|---|---|---|---|
| Weight average fiber length | | μm | 1400 | 700 | 500 | 700 | 700 |
| Flexural elastic modulus | MD | GPa | 10.4 | 10.8 | 11.1 | 12.6 | 7.8 |
| | TD | GPa | 9.2 | 8.9 | 8.5 | 7.3 | 6.9 |
| Amount of warping | | mm | 1.1 | 1.3 | 1.6 | 2.8 | 2.4 |
| Remark | | | | | | Only injection | |

TABLE 6

| Item | | Unit | Example 28 | Example 29 | Example 30 | Comparative example 19 | Comparative example 20 |
|---|---|---|---|---|---|---|---|
| Thermoplastic resin (a) | Nylon 6 | Part by weight | 70 | 70 | 70 | 70 | 70 |
| | Polypropylene | | | | | | |
| | PPS | | | | | | |
| Fibrous filler (b) | Carbon fiber | Part by weight | | | | | |
| | Glass fiber | Part by weight | 30 | 30 | 30 | 30 | 30 |
| Pellet length | | mm | 6 | 6 | 6 | 6 | 6 |
| Thickness of molded product | | mm | 2 | 2 | 2 | 2 | 2 |
| Temperature for molding | | ° C. | 260 | 260 | 260 | 260 | 260 |
| Temperature of mold | | ° C. | 80 | 80 | 80 | 80 | 80 |
| Back pressure | | MPa | 5 | 10 | 15 | 10 | 10 |
| Amount of mold opening | | mm | 2 | 2 | 2 | 0 | 2 |
| Injection time | | sec | 1 | 1 | 1 | 1 | 1 |
| t0: Difference between time for starting injection (tis) and time for starting to close mold (tps) | | sec | 0.6 | 0.6 | 0.6 | — | 0.2 |
| t1: Difference between time for starting to close mold (tps) and time for finishing injection (tif) | | sec | 0.4 | 0.4 | 0.4 | — | 0.8 |
| t2: Difference between time for finishing injection (tif) and time for finishing to close mold (tpf) | | sec | 0.6 | 0.6 | 0.6 | — | 0.2 |
| t2/t1 | | | 1.5 | 1.5 | 1.5 | — | 0.25 |
| t0/t1 | | | 1.5 | 1.5 | 1.5 | — | 0.25 |
| Thickness of core layer | | % | 10 | 10 | 10 | 30 | 25 |
| Weight average fiber length | | μm | 2500 | 1600 | 1000.0 | 1600 | 1600 |
| Flexural elastic modulus | MD | GPa | 7.1 | 6.8 | 6.3 | 8.5 | 8.0 |
| | TD | GPa | 6.3 | 6.0 | 5.0 | 5.3 | 5.8 |
| Amount of warping | | mm | 2.1 | 2.4 | 2.7 | 4.2 | 3.6 |
| Remark | | | | | | Only injection | |

The invention claimed is:

1. A method of producing an injection molded body by injection molding a fiber reinforced thermoplastic resin composition formed by combining fibrous filler (b) with a thermoplastic resin (a) so that a weight average fiber length in said injection molded body is 300 μm or more, by injection press molding in which a mold is started to be closed after injection is started, wherein injection molding is carried out at a condition where a ratio (t2/t1) of a difference (t2) between a time of finishing injection (tif) and a time of finishing to close said mold (tpf) to a difference (t1) between a time of starting to close said mold (tps) and said time of finishing injection (tif) becomes 1.1 or more.

2. The method according to claim 1, wherein said injection molded body is an injection molded body having a skin layer, a core layer and a skin layer in this order in a thickness direction, and a thickness of said core layer, in which a primary orientation direction of said fibrous filler (b) is 40° or less when a direction perpendicular to a flow direction of said fiber reinforced thermoplastic resin composition at a time of injection molding is set at 0°, is 20% or less relative to a thickness of said injection molded body.

3. The method according to claim 1, wherein said thermoplastic resin (a) is at least one selected from the group consisting of a polypropylene, a polyamide, a polyphenylene sulfide, a polyimide, a polyetherketone and a polyetheretherketone.

4. The method according to claim 1, wherein said fibrous filler (b) is at least one selected from the group consisting of carbon fibers, glass fibers and aramide fibers.

5. The method according to claim 1, wherein said injection press molding is carried out using long fiber pellets with a same length as a length of said fibrous filler (b) as said fiber reinforced thermo-plastic resin composition.

6. The method according to claim 5, wherein said injection molded body is an injection molded body having a skin layer, a core layer and a skin layer in this order in a thickness direction, and a thickness of said core layer, in which a primary orientation direction of said fibrous filler (b) is 40° or less when a direction perpendicular to a flow direction of said fiber reinforced thermoplastic resin composition at a time of injection molding is set at 0°, is 20% or less relative to a thickness of said injection molded body.

7. The method according to claim 5, wherein said thermoplastic resin (a) is at least one selected from the group consisting of a polypropylene, a polyamide, a polyphenylene sulfide, a polyimide, a polyetherketone and a polyetheretherketone.

8. The method according to claim 5, wherein said fibrous filler (b) is at least one selected from the group consisting of carbon fibers, glass fibers and aramide fibers.

* * * * *